(12) United States Patent
Davis

(10) Patent No.: US 8,550,051 B2
(45) Date of Patent: Oct. 8, 2013

(54) ENGINE COMBUSTION CHAMBER FEATURES FOR CAMSHAFT WITH DIFFERENTIAL VALVE LIFT

(75) Inventor: Richard Stephen Davis, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 257 days.

(21) Appl. No.: 12/639,276

(22) Filed: Dec. 16, 2009

(65) Prior Publication Data

US 2011/0139112 A1  Jun. 16, 2011

(51) Int. Cl.
*F02F 1/00* (2006.01)
(52) U.S. Cl.
USPC ............ 123/193.2; 123/41.35; 123/46 R; 123/65 W; 123/307; 123/193.6
(58) Field of Classification Search
USPC ....... 123/193.2, 671, 41.35, 46 R, 65 W, 307; 92/186, 209, 239
See application file for complete search history.

(56) References Cited

U.S. PATENT DOCUMENTS

| | | | | |
|---|---|---|---|---|
| 1,856,328 A | * | 5/1932 | French | 123/301 |
| 2,231,392 A | * | 2/1941 | McCarthy | 123/307 |
| 2,269,084 A | * | 1/1942 | McCarthy | 123/298 |
| 3,516,394 A | | 6/1970 | Nichols | |
| 4,258,686 A | * | 3/1981 | Matsuno et al. | 123/430 |
| 4,289,099 A | * | 9/1981 | Nakanishi et al. | 123/307 |
| 4,359,027 A | * | 11/1982 | Scharpf | 123/307 |
| 6,708,666 B2 | * | 3/2004 | Roberts, Jr. | 123/256 |
| 7,721,704 B2 | * | 5/2010 | Lehmann | 123/307 |
| 7,845,075 B2 | | 12/2010 | Fritz et al. | |
| 8,025,035 B2 | * | 9/2011 | Berger | 123/90.16 |
| 8,042,504 B2 | * | 10/2011 | Berger | 123/90.17 |
| 2007/0277758 A1 | * | 12/2007 | Fischer et al. | 123/90.17 |
| 2008/0078346 A1 | * | 4/2008 | Lee et al. | 123/90.17 |
| 2009/0159045 A1 | * | 6/2009 | Hitomi et al. | 123/406.58 |
| 2009/0229550 A1 | * | 9/2009 | Clever et al. | 123/90.17 |
| 2011/0023802 A1 | * | 2/2011 | Comello | 123/90.17 |
| 2011/0162605 A1 | * | 7/2011 | Wigsten | 123/90.17 |

FOREIGN PATENT DOCUMENTS

| | | |
|---|---|---|
| DE | 19855932 A1 | 6/2000 |
| EP | 0582846 B1 | 4/1996 |
| JP | 58206821 A | 12/1983 |

* cited by examiner

*Primary Examiner* — Marguerite McMahon
*Assistant Examiner* — James Kim
(74) *Attorney, Agent, or Firm* — Harness, Dickey & Pierce, P.L.C.

(57) ABSTRACT

An engine assembly includes an engine structure including an engine block defining a cylinder bore and a cylinder head, a piston located in the cylinder bore, and a camshaft assembly. The piston, cylinder head, and cylinder bore cooperate to define a combustion chamber including first and second longitudinal end surfaces defined by the cylinder head and the piston. A first protrusion may extend longitudinally from one of the first and second longitudinal end surfaces and radially inward from a circumference of the combustion chamber to a location between a first intake port and a first exhaust port in communication with the combustion chamber. The camshaft assembly may include a first intake lobe that opens a first intake valve and a second intake lobe that opens a second intake valve. The first intake lobe may be rotationally offset from the second intake lobe in a rotational direction of the camshaft assembly.

19 Claims, 10 Drawing Sheets

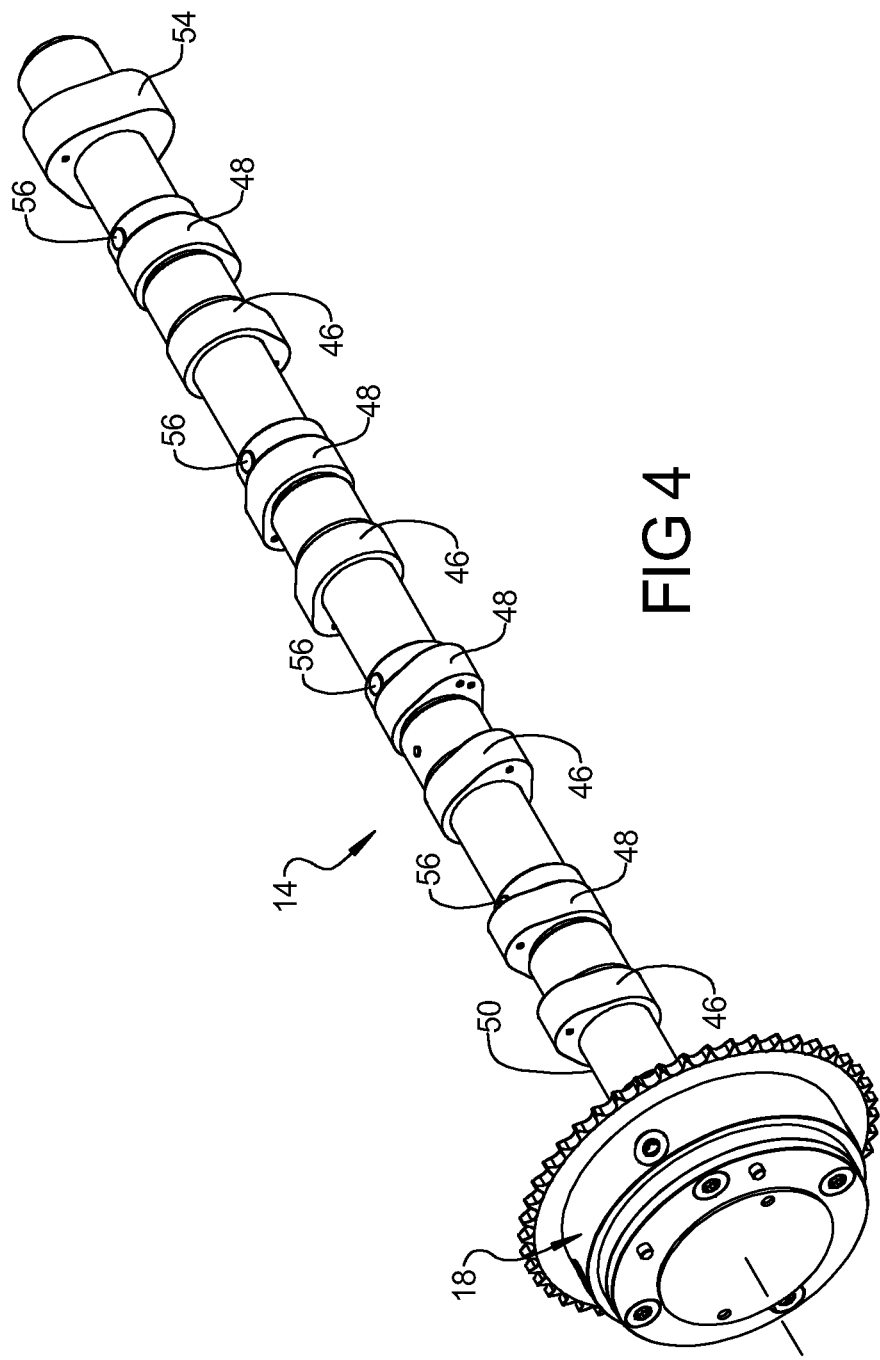

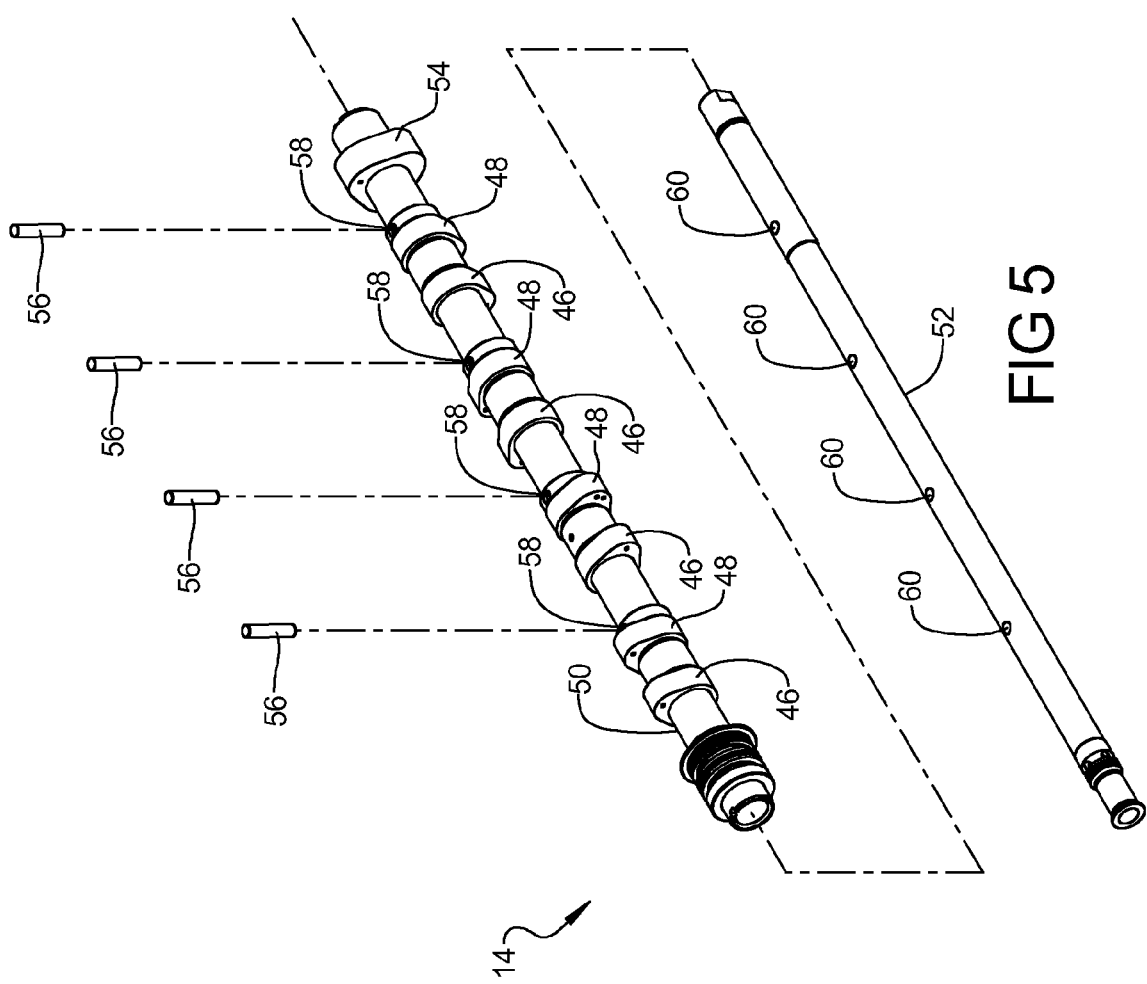

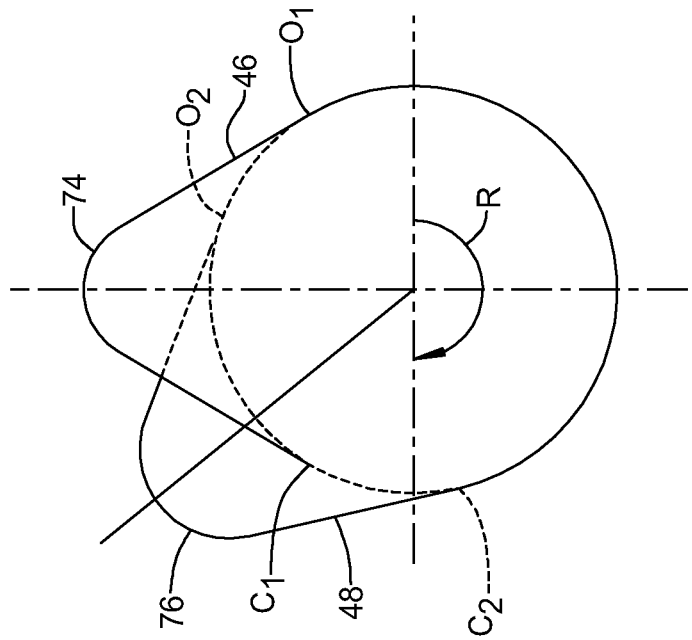
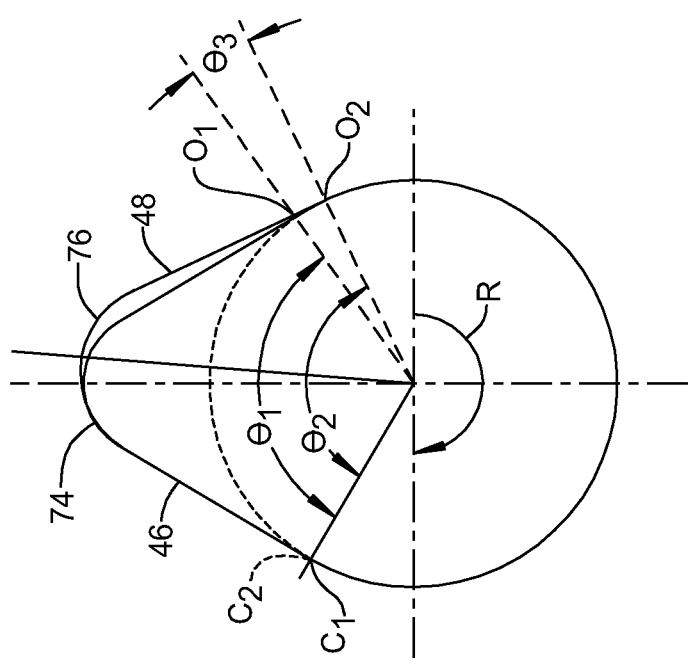
FIG 8
FIG 9

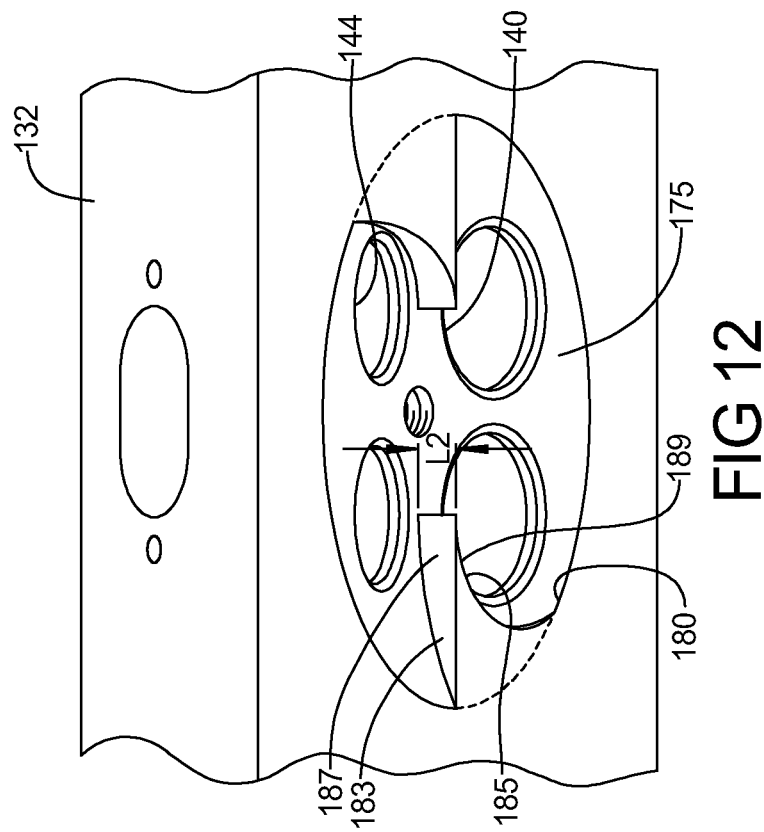
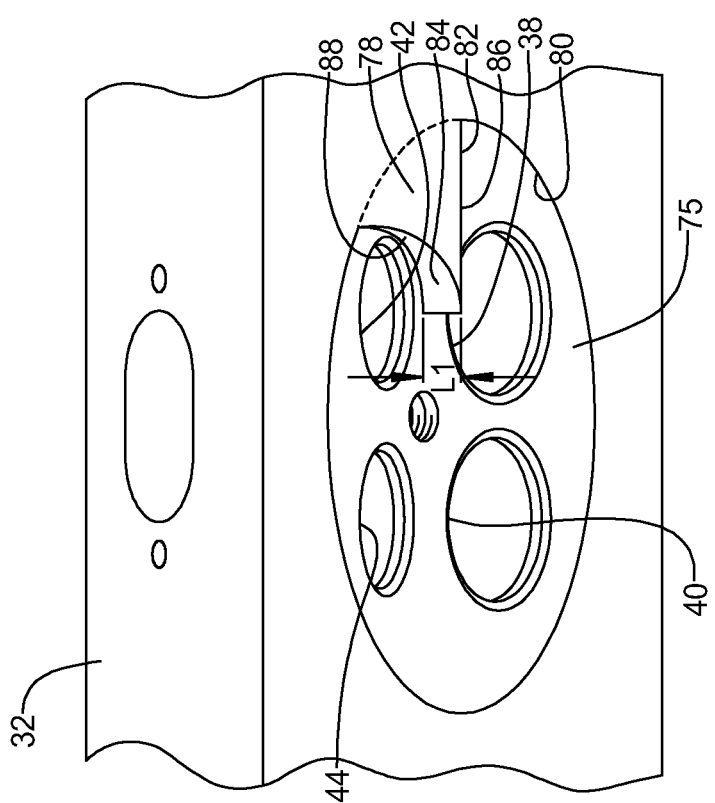

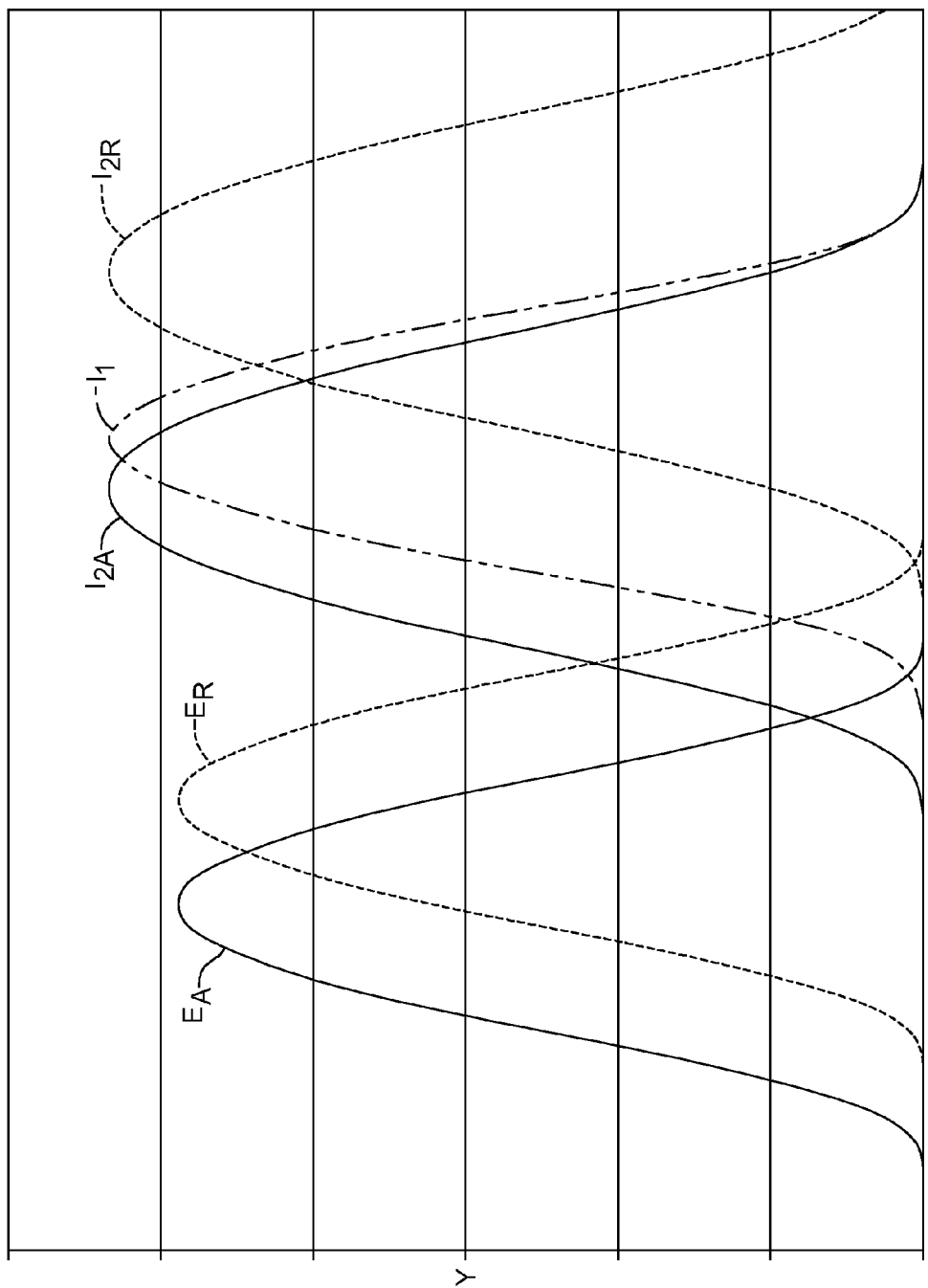

US 8,550,051 B2

ENGINE COMBUSTION CHAMBER FEATURES FOR CAMSHAFT WITH DIFFERENTIAL VALVE LIFT

FIELD

The present disclosure relates to engine valvetrains, and more specifically to engine combustion chamber features for concentric camshaft assemblies with differential valve lift.

BACKGROUND

This section provides background information related to the present disclosure which is not necessarily prior art.

Internal combustion engines may combust a mixture of air and fuel in cylinders and thereby produce drive torque. Air and fuel flow into and out of the cylinders may be controlled by a valvetrain. The valvetrain may include a camshaft that actuates intake and exhaust valves and thereby controls the timing and amount of air and fuel entering the cylinders and exhaust gases leaving the cylinders.

SUMMARY

An engine assembly may include an engine structure, a piston, first and second intake valves, first and second valve lift assemblies, and a camshaft assembly. The engine structure may include an engine block defining a cylinder bore and a cylinder head coupled to the engine block. The cylinder head may define a first intake port, a second intake port adjacent the first intake port and a first exhaust port adjacent the first intake port. The piston may be located within the cylinder bore and the piston, cylinder head, and cylinder bore may cooperate to define a combustion chamber. The combustion chamber may include a first longitudinal end surface defined by the cylinder head, a second longitudinal end surface defined by the piston, and a first protrusion. The first longitudinal end surface may include the first and second intake ports and the first exhaust port. The first protrusion may extend longitudinally from one of the first and second longitudinal end surfaces toward the other of the first and second longitudinal end surfaces. The first protrusion may additionally extend radially inward from a circumference of the combustion chamber to a location between the first intake port and the first exhaust port. The first intake valve may be supported by the engine structure and may selectively open and close the first intake port. The second intake valve may be supported by the engine structure and may selectively open and close the second intake port. The first valve lift assembly may be engaged with the first intake valve and the second valve lift assembly may be engaged with the second intake valve. The camshaft assembly may be rotationally supported by the engine structure and may include a first intake lobe engaged with the first valve lift mechanism and a second intake lobe engaged with the second valve lift mechanism. The first intake lobe may be rotationally offset from the second intake lobe in a rotational direction of the camshaft assembly.

In another arrangement, the piston may include a cylindrical body adapted to be located in an engine combustion chamber. The cylindrical body may include an end surface opposite first and second intake ports and a first exhaust port in the combustion chamber. A first protrusion may extend longitudinally from the end surface and radially inward from a circumference of the piston to a location between the first intake port and the first exhaust port. The first protrusion may define a first lateral side including a first planar surface facing the first intake port and a second lateral side facing the first exhaust port.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

FIG. 4 is a perspective view of the intake cam phaser and intake camshaft assembly shown in FIG. 1;

FIG. 5 is an exploded perspective view of the intake camshaft assembly shown in FIG. 1;

FIG. 8 is a schematic illustration of an intake cam lobe in an advanced position according to the present disclosure;

FIG. 9 is a schematic illustration of the intake cam lobe of FIG. 8 in a retarded position according to the present disclosure;

FIG. 11 is a bottom fragmentary perspective view of a cylinder head including the combustion chamber features of FIG. 3;

FIG. 12 is a bottom fragmentary perspective view of an alternate cylinder head including the combustion chamber features of FIG. 10;

FIG. 15 is a graphical illustration of valve opening profiles according to the present disclosure.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Figure 1:
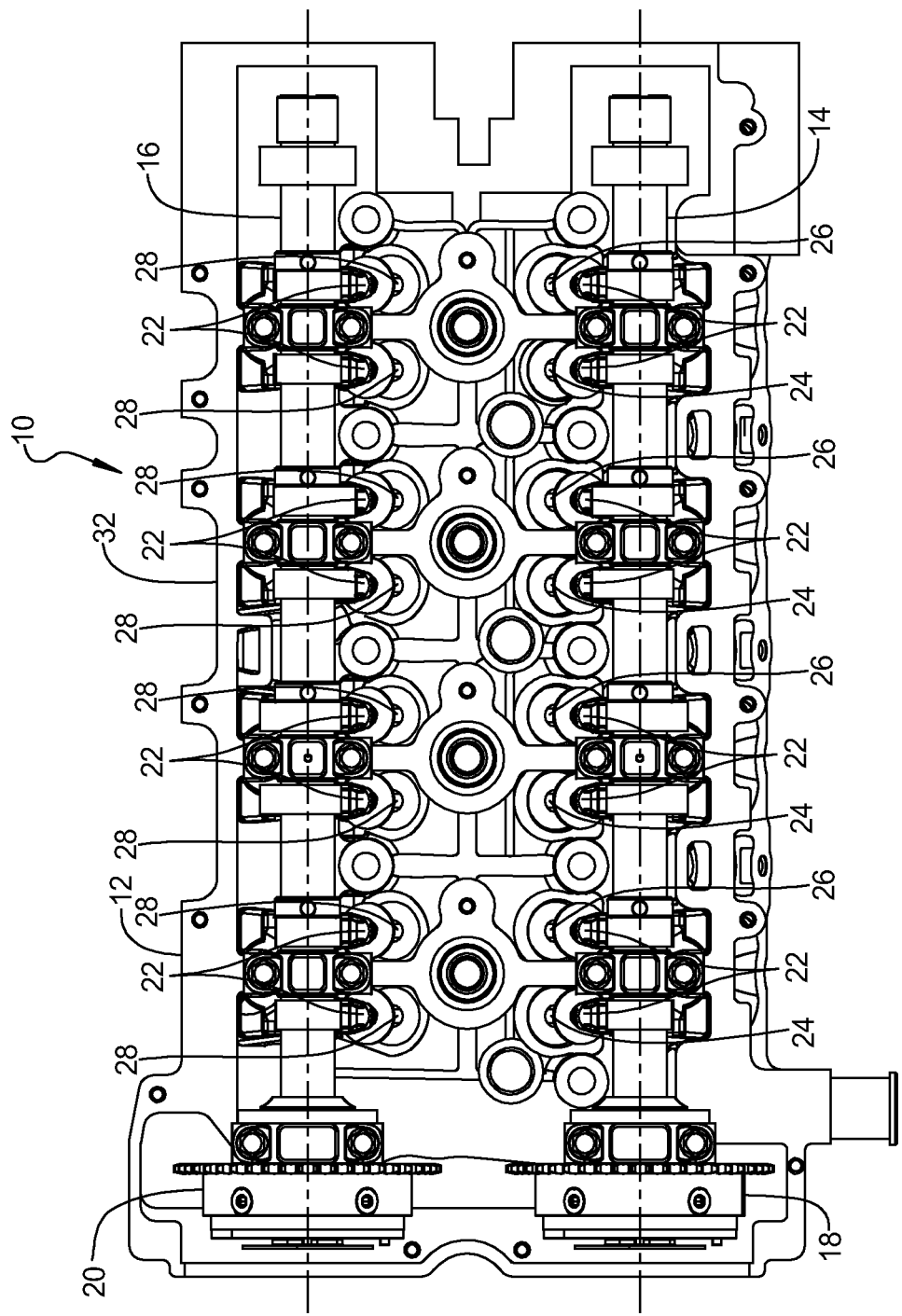
FIG. 1 is a plan view of an engine assembly according to the present disclosure.
Figure 2:
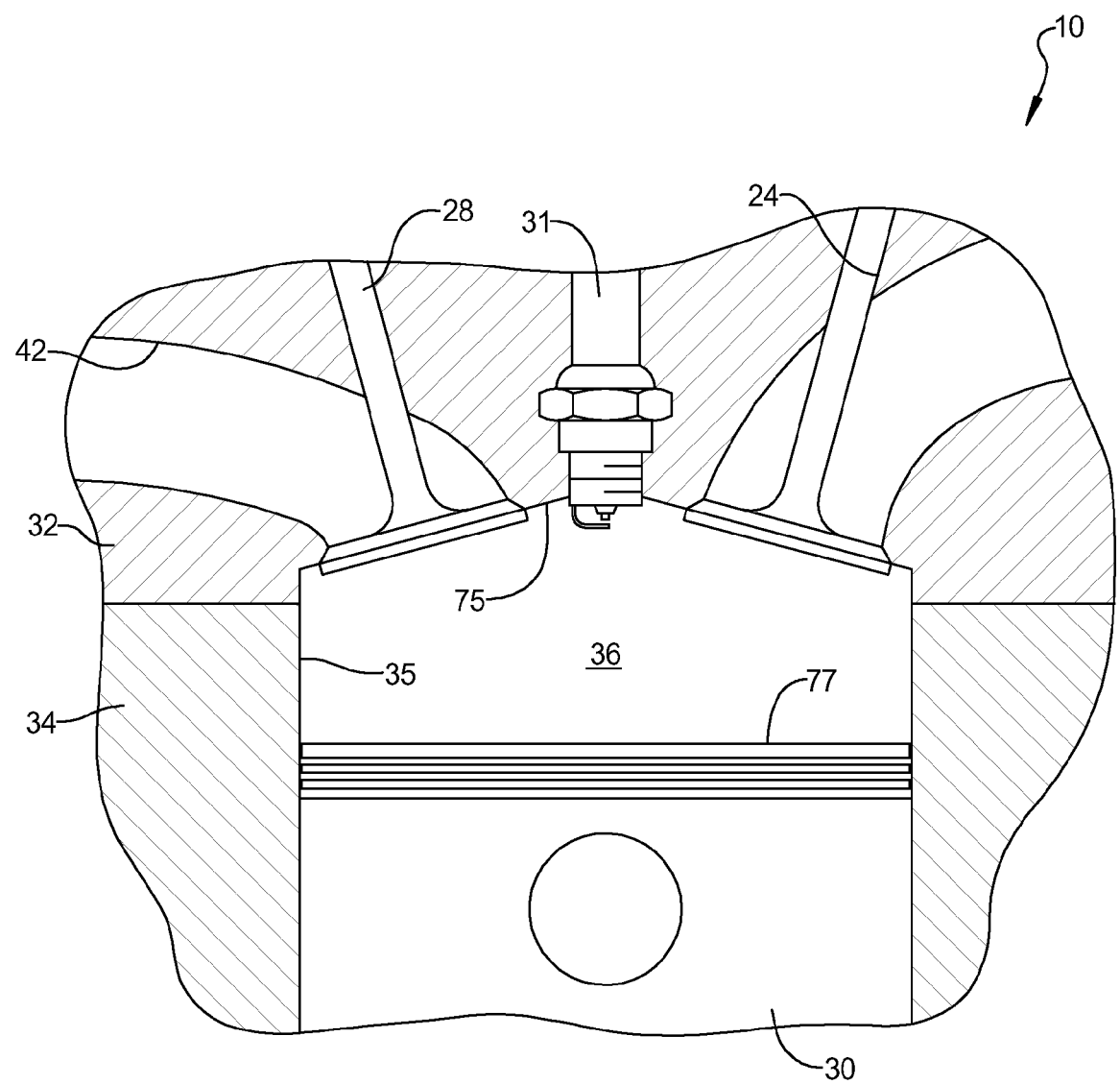
FIG. 2 is a schematic section view of the engine assembly of FIG. 1.
Figure 3:
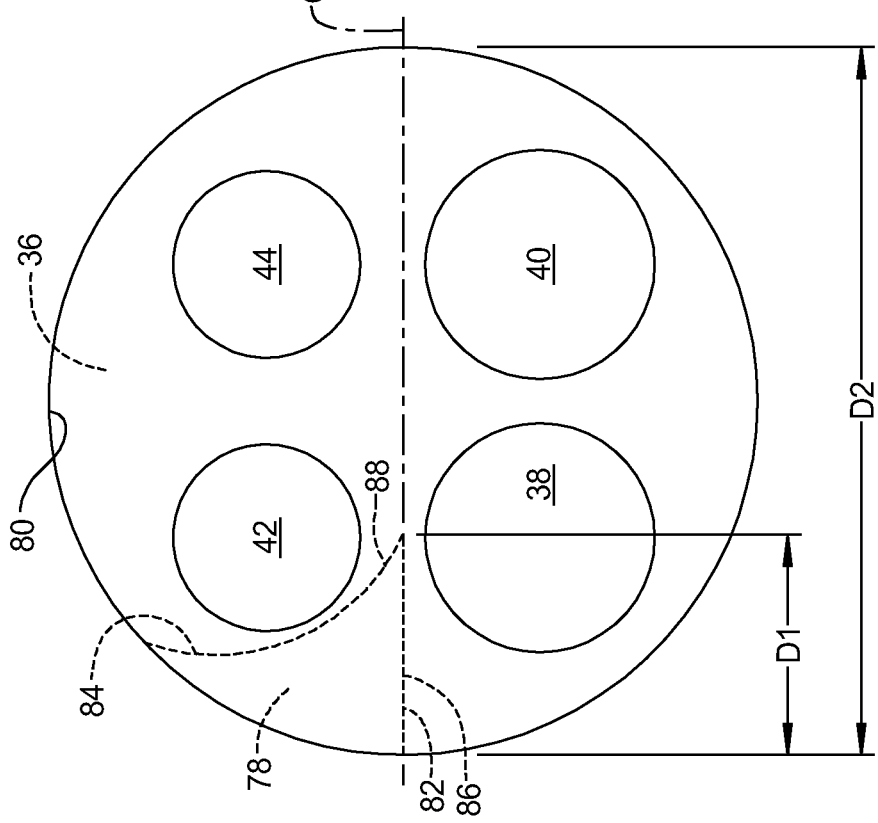
FIG. 3 is a schematic top plan illustration of intake and exhaust ports and combustion chamber features of the engine assembly of FIG. 1.

With reference to FIGS. 1-3, an engine assembly 10 is illustrated. The engine assembly 10 may include an engine structure 12, intake and exhaust camshaft assemblies 14, 16 rotationally supported on the engine structure 12, intake and exhaust cam phasers 18, 20, valve lift assemblies 22, first and second intake valves 24, 26, exhaust valves 28, pistons 30, and spark plugs 31. In the present non-limiting example, the engine assembly 10 is shown as a dual overhead camshaft engine with the engine structure 12 including a cylinder head 32 rotationally supporting the intake and exhaust camshaft assemblies 14, 16. The engine structure 12 may additionally include an engine block 34 defining cylinder bores 35 receiving the pistons 30 and cooperating with the cylinder head 32 and the pistons 30 to define combustion chambers 36 (FIG. 2).

As seen in FIGS. 2 and 3, the cylinder head 32 may define first and second intake ports 38, 40 and first and second exhaust ports 42, 44 for each combustion chamber 36. The valve lift assemblies 22 may be engaged with the first intake valves 24, the second intake valves 26 and the exhaust valves 28 to open the first and second intake ports 38, 40 and the first and second exhaust ports 42, 44. Specifically, the first intake valves 24 may open and close the first intake ports 38 and the second intake valves 26 may open and close the second intake ports 40.

As seen in FIGS. 4 and 5, the intake camshaft assembly 14 may include first and second intake lobes 46, 48, first and second shafts 50, 52, and a fuel pump drive lobe 54. However, it is understood that the present disclosure applies equally to camshaft assemblies that do not include a fuel pump drive lobe. The first shaft 50 may be rotationally supported by the engine structure 12 and the second shaft 52 may be rotationally supported within the first shaft 50. The first intake lobes 46 may be located on and fixed for rotation with the first shaft 50. The second intake lobes 48 may be rotationally supported on the first shaft 50 and fixed for rotation with the second shaft 52. By way of non-limiting example, the second intake lobes 48 may be coupled to the second shaft 52 by pins 56 extending through apertures 58 in the second intake lobes 48 and apertures 60 in the second shaft 52. While illustrated as a concentric camshaft assembly, it is understood that the present disclosure is not limited to such arrangements and applies equally to fixed lobe camshafts.

Figure 7:
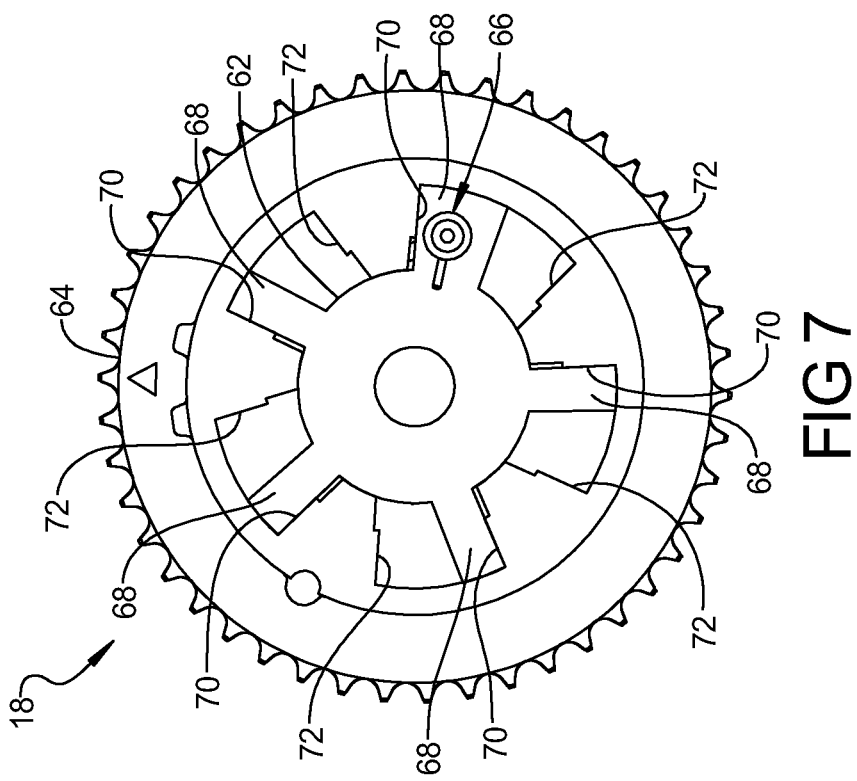
FIG. 7 is a schematic illustration of the intake cam phaser of FIG. 1 in a retarded position.
Figure 6:
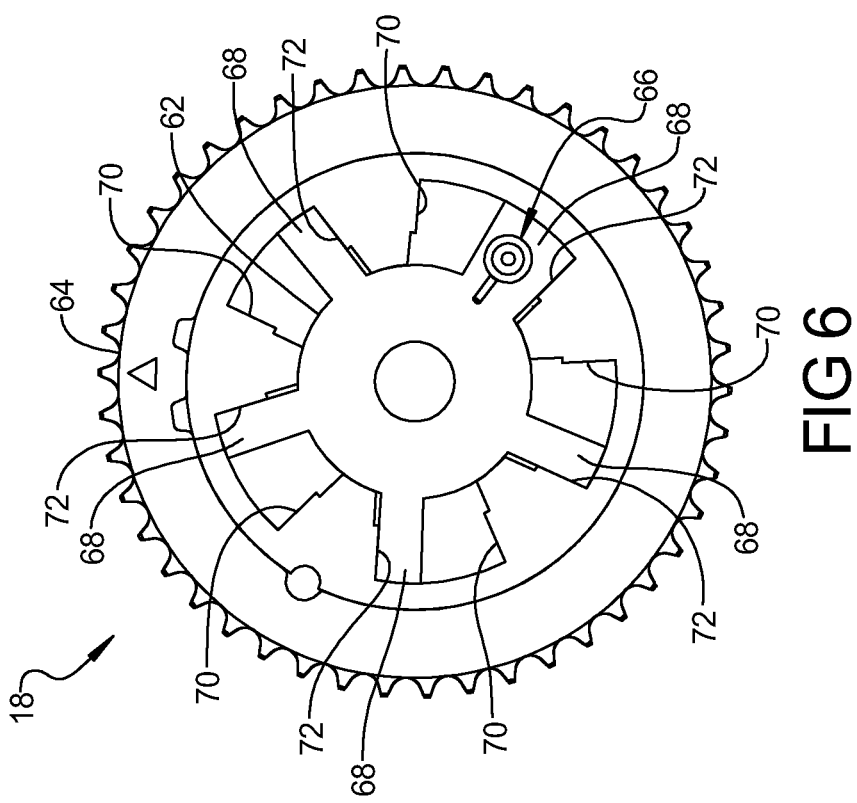
FIG. 6 is a schematic illustration of the intake cam phaser of FIG. 1 in an advanced position.

As seen in FIGS. 6 and 7, the intake cam phaser 18 may include a rotor 62, a stator 64 and a lock mechanism 66. The stator 64 may be rotationally driven by an engine crankshaft (not shown) and the rotor 62 may be rotationally supported within the stator 64. The rotor 62 may include radially extending vanes 68 cooperating with the stator 64 to define hydraulic advance and retard chambers 70, 72 in communication with pressurized fluid, such as oil.

The first shaft 50 (and therefore first intake lobes 46) may be fixed for rotation with the stator 64 and the second shaft 52 (and therefore second intake lobes 48) may be fixed for rotation with the rotor 62. The rotor 62 may be displaced from an advanced position (FIG. 6) to a retarded position (FIG. 7) to vary the opening timing of the second intake valves 26. The advanced position may correspond to a fully advanced position and the retarded position may correspond to a fully retarded position. While illustrated as a hydraulically actuated vane phaser, it is understood that the present disclosure is not limited to such arrangements. Further, while FIGS. 6 and 7 illustrate the intake cam phaser 18 in fully advanced and fully retarded positions, the intake cam phaser 18 may additionally provide an intermediate park position. By way of non-limiting example, the intermediate park position may include the locking mechanism 66 securing the rotor 62 between the advanced and retarded positions.

The first and second intake lobes 46, 48 are illustrated in FIGS. 8 and 9. The first intake lobe 46 may define a first valve opening region 74 having first angular extent ($\theta_1$) between a first starting (opening) point ($O_1$) and a first ending (closing) point ($C_1$). The second intake lobe 48 may define a second valve opening region 76 having a second angular extent ($\theta_2$) between a second starting (opening) point ($O_2$) and a second ending (closing) point ($C_2$). The second angular extent ($\theta_2$) may be greater than the first angular extent ($\theta_1$).

By way of non-limiting example, the second angular extent ($\theta_2$) may be at least five percent greater than the first angular extent ($\theta_1$), and more specifically between ten and twenty-five percent greater than the first angular extent ($\theta_1$). Therefore, the second angular extent ($\theta_2$) may be at least five degrees greater than the first angular extent ($\theta_1$), and more specifically between ten and twenty-five degrees greater than the first angular extent ($\theta_1$). However, it is understood that the present disclosure applies equally to arrangements where the first angular extent ($\theta_1$) is equal to the second angular extent ($\theta_2$) or where the first angular extent ($\theta_1$) is greater than the second angular extent ($\theta_2$).

The intake cam phaser 18 may displace the second intake lobes 48 from a first (advanced) position (FIG. 8) to a second (retarded) position (FIG. 9). In the advanced position, the first and second starting points ($O_1$, $O_2$) may be rotationally offset from one another and the first and second ending points ($C_1$, $C_2$) may be within five degrees of one another. More specifically, the first and second ending points ($C_1$, $C_2$) may be rotationally aligned with one another. By way of non-limiting example, the second starting point ($O_2$) may be located ahead of the first starting point ($O_1$) in a rotational direction (R) of the first and second intake lobes 46, 48 by an angle ($\theta_3$). The offset angle ($\theta_3$) may be at least five degrees and more specifically between ten and twenty-five degrees.

In the retarded position, the first and second starting points ($O_1$, $O_2$) may be rotationally offset from one another and the first and second ending points ($C_1$, $C_2$) may also be rotationally offset from one another. More specifically, the second starting point ($O_2$) may be located behind the first starting point ($O_1$) in the rotational direction (R). The second ending point ($C_2$) may also be located behind the first ending point ($C_1$) in the rotational direction (R). In the arrangement where the intake cam phaser 18 provides the intermediate park position, the locking mechanism 66 may secure the rotor 62 in a position where the first and second starting points ($O_1$, $O_2$) are rotationally aligned with one another.

Referring to FIGS. 2, 3, 11 and 13, the combustion chamber 36 may be defined between the cylinder head 32 and the piston 30. More specifically, the cylinder head 32 may define a first longitudinal end surface 75 and the piston 30 may define a second longitudinal end surface 77 of the combustion chamber 36. As seen in FIG. 3, a protrusion 78 may be defined on one of the first and second longitudinal end surfaces 75, 77. In a first non-limiting example seen in FIG. 11, the protrusion 78 may be part of the cylinder head 32, extending longitudinally from the first longitudinal end surface 75 toward the second longitudinal end surface 77 of the piston 30. The orientation in FIG. 11 appears opposite the orientation in FIG. 3 since FIG. 3 presents a top view and FIG. 11 presents a bottom view. In an alternate arrangement seen in FIG. 13, the protrusion 78 may be part of the piston 30, extending longitudinally from the second longitudinal end surface 77 toward the first longitudinal end surface 75 of the cylinder head 32.

In either arrangement, the protrusion 78 may extend radially inward from the circumference 80 of the combustion chamber 36 to a location between the first intake port 38 and the first exhaust port 42. By way of non-limiting example, the protrusion 78 may extend radially inward from the circumference 80 a distance (D1) at least fifteen percent, and more specifically between twenty and fifty percent, of the diameter (D2) of the combustion chamber 36. The diameter (D2) may generally correspond to the diameter of the piston 30. The protrusion 78 may include first and second lateral sides 82, 84. Alternatively, instead of having a distinct second lateral side 84, the portion of the protrusion 78 opposite the first lateral side 82 may blend into the first longitudinal end surface 75 defined by the cylinder head 32. The first lateral side 82 may face the first intake port 38 and the second lateral side 84 may face the first exhaust port 42.

By way of non-limiting example, the first lateral side 82 may have a longitudinal extent (L1) of at least 1.0 millimeter (mm), and more specifically between 1.0 mm and 10.0 mm. The first lateral side 82 may define a planar surface 86 that extends generally linearly from the circumference 80 of the combustion chamber 36, forming a sharp edge. A centerline (C1) of the combustion chamber 36 may be defined between the first intake port 38 and the first exhaust port 42. The planar surface 86 may extend at an angle of less than forty-five degrees, and more specifically less than fifteen degrees, relative to the centerline (C1). By way of non-limiting example, the planar surface 86 may extend generally parallel to the centerline (C1).

The second lateral side 84 may define a curved surface 88 surrounding a portion of the first exhaust port 42. The second lateral side 84 may increase in longitudinal extent from a radially outermost portion inward. Similarly, the first lateral side 82 may increase in longitudinal extent from a radially outermost portion inward. In the arrangement of FIG. 11, the radially outermost portions of the first and second lateral sides 82, 84 may be located on the first longitudinal end surface 75. Similarly, in the arrangement of FIG. 13, the radially outermost portions of the first and second lateral sides 82, 84 may be located on the second longitudinal end surface 77. As discussed above with respect to FIG. 11, instead of having a distinct second lateral side 84, the portion of the protrusion 78 opposite the first lateral side 82 may blend into the second longitudinal end surface 77 defined by the piston 30.

Figure 13:
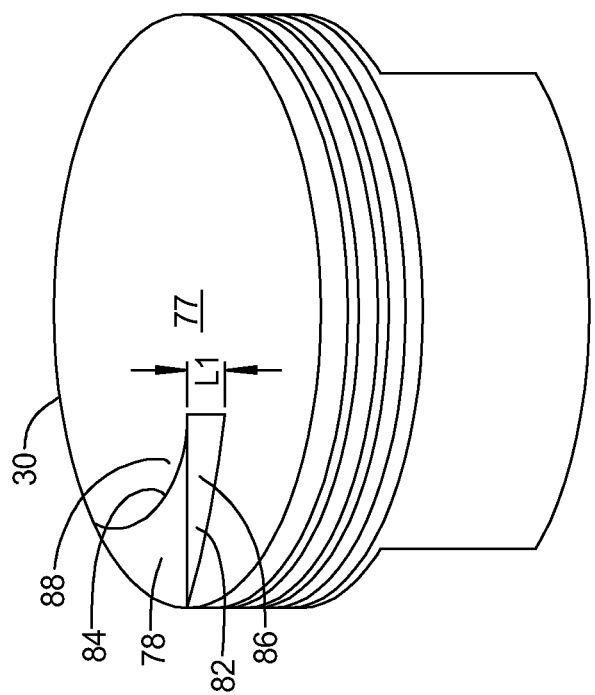
FIG. 13 is a fragmentary perspective view of a piston including the combustion chamber features of FIG. 3.

In the arrangement illustrated in FIGS. 3, 11 and 13, the protrusion 78 forms an asymmetric arrangement where the opposite side of the combustion chamber 36 does not include a similar structure. Specifically, the portion of the circumference 80 of the combustion chamber 36 opposite the protrusion 78 may have a continuous concave actuate form from the second intake port 40 to the second exhaust port 44.

Figure 10:
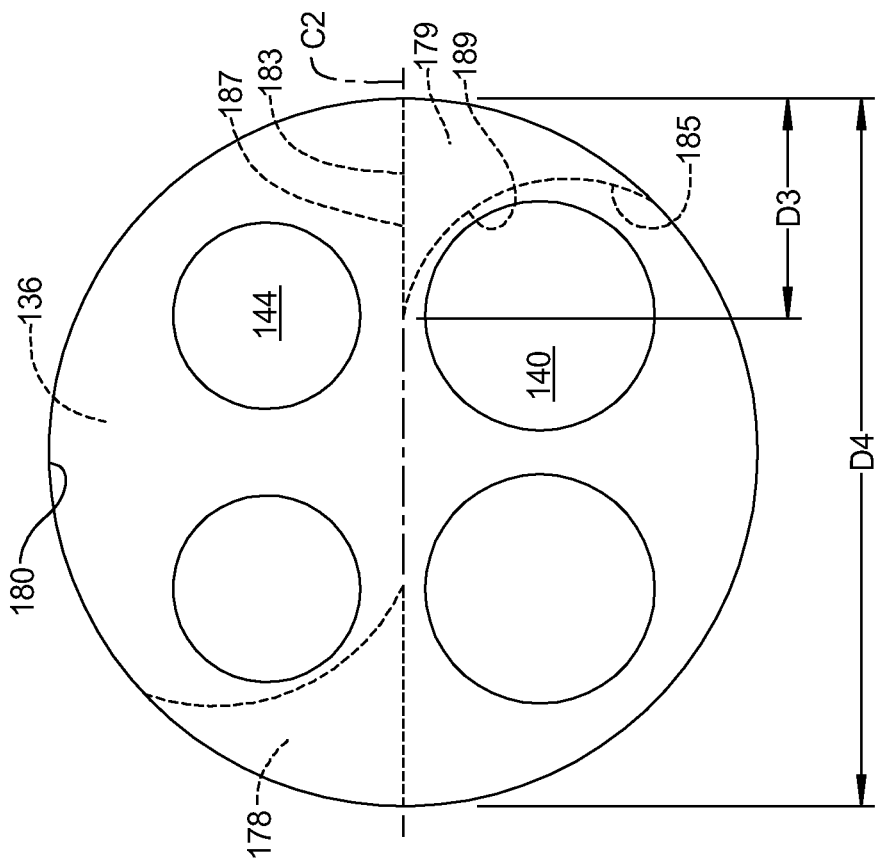
FIG. 10 is a schematic top plan illustration of intake and exhaust ports and alternate combustion chamber features according to the present disclosure.
Figure 14:
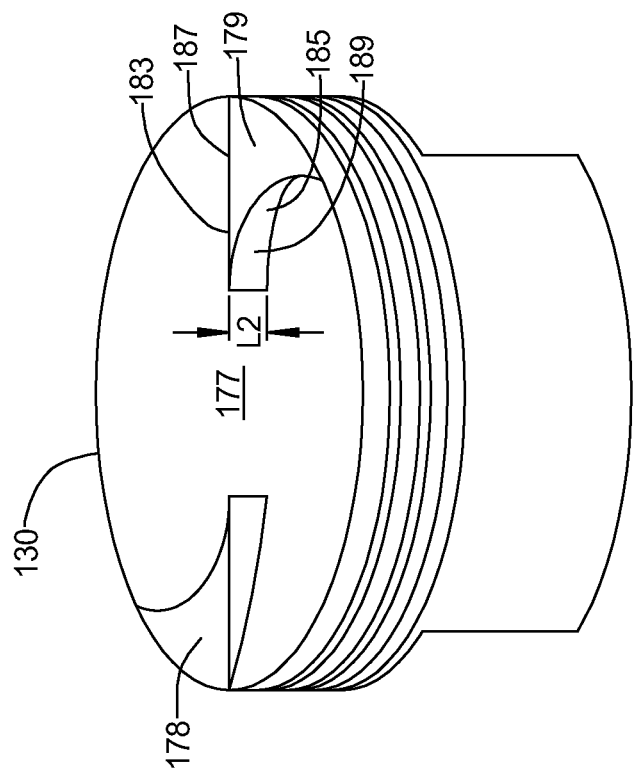
FIG. 14 is a fragmentary perspective view of an alternate piston including the combustion chamber features of FIG. 10.

In an alternate arrangement illustrated in FIGS. 10, 12 and 14, first and second protrusions 178, 179 may be included instead of a single protrusion. In a first non-limiting example seen in FIG. 12, the first and second protrusions 178, 179 may be part of the cylinder head 132, extending longitudinally from the first longitudinal end surface 175. In another non-limiting example seen in FIG. 14, the first and second protrusions 178, 179 may be part of the piston 130, extending longitudinally from the second longitudinal end surface 177. Alternatively, one of the first and second protrusions 178, 179 may be located on the piston 130 and the other of the first and second protrusions 178, 179 may be located on the cylinder head 132.

The first protrusion 178 may be generally similar to the protrusion 78 described above and therefore will not be discussed in detail with the understanding that the description above applies equally. The second protrusion 179 may be similar in structure to the first protrusion 178, but located opposite the first protrusion 178 in the combustion chamber 136. Specifically, in either the arrangement of FIG. 12 or the arrangement of FIG. 14, the second protrusion 179 may extend radially inward from the circumference 180 of the combustion chamber 136 and toward the first protrusion 178 to a location between the second intake port 140 and the second exhaust port 144.

By way of non-limiting example, the second protrusion 179 may extend radially inward from the circumference 180 a distance (D3) at least fifteen percent, and more specifically between twenty and fifty percent, of the diameter (D4) of the combustion chamber 136. The diameter (D4) may generally correspond to the diameter of the piston 130. The second protrusion 179 may include first and second lateral sides 183, 185. Alternatively, instead of having a distinct second lateral side 185, the portion of the second protrusion 179 opposite the first lateral side 183 may blend into the first longitudinal end surface 175 defined by the cylinder head 132. The first lateral side 183 may face the second exhaust port 144 and the second lateral side 185 may face the second intake port 140.

The first lateral side 183 may have a longitudinal extent (L2) of at least 1.0 millimeter (mm), and more specifically between 1.0 mm and 10.0 mm. The first lateral side 183 may define a planar surface 187 that extends generally linearly from the circumference 180 of the combustion chamber 136, forming a sharp edge. A centerline (C2) of the combustion chamber 136 may be defined between the second intake port 140 and the second exhaust port 144. The planar surface 187 may extend at an angle of less than forty-five degrees, and more specifically less than fifteen degrees, relative to the centerline (C1). By way of non-limiting example, the planar surface 187 may extend generally parallel to the centerline (C1).

The second lateral side 185 may define a curved surface 189 surrounding a portion of the second intake port 140. The second lateral side 185 may increase in longitudinal extent from a radially outermost portion inward. Similarly, the first lateral side 183 may increase in longitudinal extent from a radially outermost portion inward. In the arrangement of FIG. 12, the radially outermost portions of the first and second lateral sides 183, 185 may be located on the first longitudinal end surface 175. Similarly, in the arrangement of FIG. 14, the radially outermost portions of the first and second lateral sides 183, 185 may be located on the second longitudinal end surface 177. As discussed above with respect to FIG. 12, instead of having a distinct second lateral side 185, the portion of the second protrusion 179 opposite the first lateral side 183 may blend into the second longitudinal end surface 177 defined by the piston 130.

FIG. 15 illustrates the displacement of the second intake valves 26 relative to the first intake valves 24 and relative to the exhaust valves 28 during operation. In the graph shown in FIG. 15, the x-axis represents the rotational angle of the intake and exhaust camshaft assemblies 14, 16 and the y-axis represents valve lift. The curve ($E_A$) represents the exhaust camshaft assembly 16 advanced and the curve ($E_R$) represents the exhaust camshaft assembly 16 retarded. The curve ($I_1$) represents the first (fixed) intake lobe 46, the curve ($I_{2A}$) represents the second (phased) intake lobe 48 advanced and the curve ($I_{2R}$) represents the second (phased) intake lobe 48 retarded. The advanced and retarded positions of the exhaust camshaft assembly 16 and the second (phased) intake lobe 48 may correspond to fully advanced and fully retarded positions, respectively.

As illustrated in FIG. 15, when the second intake lobe 48 is in the advanced position, the opening of the second intake valve 26 occurs before the opening of the first intake valve 24 and the closing of the second intake valve 26 is aligned with the closing of the first intake valve 24. However, as indicated above, the present disclosure is not limited to such arrangements. When the second intake lobe 48 is in the retarded position, the opening of the second intake valve 26 occurs after the opening of the first intake valve 24 and closing of the second intake valve 26 occurs after the closing of the first intake valve 24. Also, as seen in FIG. 14, varying the opening and closing timing of the second intake valves 26 and the exhaust valves 28 may be used to vary valve overlap conditions. The present disclosure provides for greater variability of valve timing to realize benefits at different engine operating conditions.

By way of non-limiting example, the second intake lobes 48 may be in the first (advanced) position during low engine speed wide open throttle (WOT) conditions to optimize volumetric efficiency and torque. The second intake lobes 48 may also be in the first (advanced) position during ambient cold start conditions to increase the level of overlap between the opening of the second intake valves 26 and the exhaust valves 28. The increased overlap may generally provide for reduced hydrocarbon (HC) emission from the engine assembly 10. The second intake lobes 48 may be in the second (retarded) position during part-load engine conditions to provide delayed closing of the second intake valves 26 for reducing engine pumping loss and improving fuel economy.

The second intake lobes 48 may be in an intermediate position (between advanced and retarded) during mid and high speed WOT operating conditions to optimize the second intake valve 26 closing timing for improved volumetric efficiency and increased torque and power. The second intake lobes 48 may additionally be in the intermediate position during light load conditions, such as idle, to provide reduced overlap between the second intake valves 26 and the exhaust valves 28 and moderate the effective compression ratio to optimize light load combustion stability.

When the second intake lobe 48 is in the retarded position, the first intake valve 24 may have a first opening duration during an expansion portion of the intake stroke of the piston 30 that is greater than a second opening duration of the second intake valve 26. The greater opening duration of the first intake valve 24 during an expansion portion of the intake stroke of the piston 30 may generally cause swirl in the combustion chamber due to the imbalance in intake air flow from the first and second intake ports 38, 40. Each of the examples discussed above may reduce the swirl in the combustion chamber 36, 136. Specifically, the examples discussed above may convert the swirl flow into small scale turbulence to enhance combustion.

What is claimed is:

1. An engine assembly comprising:
    an engine structure including:
        an engine block defining a cylinder bore; and
        a cylinder head coupled to the engine block and defining a first intake port, a second intake port adjacent the first intake port, and a first exhaust port adjacent the first intake port;
    a piston located within the cylinder bore, the piston, the cylinder head and the cylinder bore defining a combustion chamber including:
        a first longitudinal end surface defined by the cylinder head and including the first and second intake ports and the first exhaust port;
        a second longitudinal end surface defined by the piston; and
        a first protrusion extending longitudinally from one of the first and second longitudinal end surfaces toward the other of the first and second longitudinal end surfaces and extending radially inward from a circumference of the combustion chamber to a location between the first intake port and the first exhaust port and adapted to reduce swirl within the combustion chamber, the other of the first and second longitudinal end surfaces being free from any protrusions, and wherein a longitudinal extent of the first protrusion increases from a radially outermost portion inward;
    a first intake valve supported by the engine structure and selectively opening and closing the first intake port;
    a second intake valve supported by the engine structure and selectively opening and closing the second intake port;
    a first valve lift assembly engaged with the first intake valve;
    a second valve lift assembly engaged with the second intake valve; and
    a camshaft assembly rotationally supported by the engine structure and including a first intake lobe engaged with the first valve lift assembly and a second intake lobe engaged with the second valve lift assembly, the first intake lobe rotationally offset from the second intake lobe in a rotational direction of the camshaft assembly.

2. The engine assembly of claim 1, wherein the first protrusion includes a first lateral side defining a planar surface facing the first intake port.

3. The engine assembly of claim 2, wherein a longitudinal extent of the first lateral side is at least 1.0 mm.

4. The engine assembly of claim 2, wherein the planar surface extends at an angle of less than 45 degrees relative to a centerline of the combustion chamber extending across the circumference of the combustion chamber between the first intake port and the first exhaust port.

5. The engine assembly of claim 4, wherein the planar surface extends at an angle of less than 15 degrees relative to the centerline.

6. The engine assembly of claim 1, wherein the first protrusion extends radially inward from the circumference of the combustion chamber a distance of at least 15 percent of the diameter of the combustion chamber.

7. The engine assembly of claim 6, wherein the first protrusion extends radially inward from the circumference of the combustion chamber a distance of between 20 percent and 50 percent of the diameter of the combustion chamber.

8. The engine assembly of claim 1, further comprising a second protrusion extending longitudinally from the one of the first and second longitudinal end surfaces of the combustion chamber defining the first protrusion toward the other of the first and second longitudinal end surfaces, the cylinder head defining a second exhaust port adjacent the second intake port and the first exhaust port, the second protrusion extending radially inward from the outer circumference of the combustion chamber to a location between the second intake port and the second exhaust port.

9. The engine assembly of claim 8, wherein the first protrusion includes a first lateral side defining a first planar surface facing the first intake port and the second protrusion includes a first lateral side defining a second planar surface facing the second exhaust port.

10. The engine assembly of claim 1, wherein the first protrusion is defined on the first longitudinal end surface of the cylinder head.

11. The engine assembly of claim 1, wherein the first protrusion is defined on the second longitudinal end surface of the piston.

12. The engine assembly of claim 1, wherein the camshaft assembly includes first and second shafts, the second shaft coaxial with and rotatable relative to the first shaft, the first intake lobe fixed for rotation with the first shaft and the second intake lobe fixed for rotation with the second shaft.

13. The engine assembly of claim 12, further comprising a cam phaser coupled to the first and second shafts and adapted to rotate the second shaft from a first rotational position to a second rotational position relative to the first shaft, the first intake lobe being rotationally offset from the second intake lobe in the rotational direction of the camshaft assembly when the second shaft is in the first rotational position.

14. The engine assembly of claim 13, wherein the cam phaser includes a first member rotationally driven by a crankshaft and a second member rotatable relative to the first member, the first shaft fixed for rotation with the first member and the second shaft fixed for rotation with the second member.

15. The engine assembly of claim 1, wherein the first intake lobe provides a first opening duration of the first intake valve during an expansion portion of an intake stroke of the piston that is greater than a second opening duration of the second intake valve during the expansion portion of the intake stroke.

16. A piston comprising:
   a cylindrical body adapted to be located in an engine combustion chamber and including an end surface opposite first and second intake ports and a first exhaust port in the combustion chamber; and
   a first protrusion extending longitudinally from the end surface and radially inward from a circumference of the piston to a location between and not overlapping the first intake port and the first exhaust port, the first protrusion defining a first lateral side including a first planar surface adapted to face the first intake port and adapted to reduce swirl within the combustion chamber and a second lateral side intersecting said first lateral side and including a curved surface adapted to face the first exhaust port.

17. The piston of claim 16, further comprising a second protrusion extending longitudinally from the end surface and radially inward from the circumference of the piston opposite the first protrusion to a location between the second intake port and a second exhaust port, the second protrusion defining a first lateral side including a second planar surface adapted to face the second exhaust port.

18. The piston of claim 17, wherein the first protrusion extends radially inward from the circumference of the piston a distance of at least 15 percent of the diameter of the piston.

19. The piston of claim 18, wherein the first protrusion extends radially inward from the circumference of the piston a distance of between 20 percent and 50 percent of the diameter of the piston.

* * * * *